(12) United States Patent
Gigante et al.

(10) Patent No.: US 12,167,524 B2
(45) Date of Patent: Dec. 10, 2024

(54) MICROWAVE OVEN HAVING GENERATOR POWER SUPPLY

(71) Applicants: WHIRLPOOL CORPORATION, Benton Harbor, MI (US); Panasonic Holdings Corporation, Osaka (JP)

(72) Inventors: Alessandro Gigante, Varese (IT); Giuseppe Tarantino, Vergiate (IT); Matteo Rinaldi, Salerno (IT); David O. Wahlander, Norrkoping (SE)

(73) Assignees: Whirlpool Corporation, Benton Harbor, MI (US); Panasonic Holdings Corporation (JP)

( * ) Notice: Subject to any disclaimer, the term of this patent is extended or adjusted under 35 U.S.C. 154(b) by 0 days.

(21) Appl. No.: 18/461,613

(22) Filed: Sep. 6, 2023

(65) Prior Publication Data

US 2023/0422363 A1 Dec. 28, 2023

Related U.S. Application Data

(62) Division of application No. 16/307,232, filed as application No. PCT/US2016/048040 on Aug. 22, 2016, now Pat. No. 11,792,897.

(51) Int. Cl.
*H05B 6/76* (2006.01)
*H02M 1/00* (2007.01)
(Continued)

(52) U.S. Cl.
CPC .............. *H05B 6/76* (2013.01); *H02M 1/322* (2021.05); *H02M 1/007* (2021.05); *H05B 6/68* (2013.01); *H05B 2206/046* (2013.01)

(58) Field of Classification Search
CPC ....... H05B 6/76; H05B 6/68; H05B 2206/046
(Continued)

(56) References Cited

U.S. PATENT DOCUMENTS 4,415,887 A * 11/1983 Kawase ............... H05B 6/6432
327/43
4,461,940 A *  7/1984 Ishimura ............. H05B 6/6417
219/722
(Continued)

FOREIGN PATENT DOCUMENTS

GB       2367196      3/2002
JP      2011146143    7/2011
(Continued)

*Primary Examiner* — Janie M Loeppke
*Assistant Examiner* — Simpson A Chen
(74) *Attorney, Agent, or Firm* — Price Heneveld LLP

(57) ABSTRACT

A microwave oven and a method of operating the same is provided herein. The method includes the steps of: sensing that a door of the microwave is in an open state; interrupting a power input to a generator power supply unit comprising a first converter, a first energy reserve, a second energy reserve located downstream from the first energy reserve, and a second converter located between the first and second energy reserves; detecting an input voltage; and disabling the second converter if the detected input voltage is less than a threshold voltage that is proportional to the detected input voltage, wherein disabling the second converter triggers the second energy reserve to discharge, and wherein the time necessary to discharge the second energy reserve is free of influence from the first energy reserve and is independent of the detected input voltage.

16 Claims, 5 Drawing Sheets

(51) Int. Cl.
   *H02M 1/32* (2007.01)
   *H05B 6/68* (2006.01)
(58) Field of Classification Search
   USPC ........................................................ 219/738
   See application file for complete search history.

(56) References Cited

U.S. PATENT DOCUMENTS

| | | | |
|---|---|---|---|
| 4,648,015 A | 3/1987 | Davis et al. | |
| 4,704,674 A * | 11/1987 | Maehara | H02M 3/335 |
| | | | 315/106 |
| 4,888,461 A * | 12/1989 | Takano | H05B 6/685 |
| | | | 363/55 |
| 4,904,837 A | 2/1990 | Low et al. | |
| 5,293,020 A | 3/1994 | Han et al. | |
| 6,295,214 B1 | 9/2001 | Matsumoto et al. | |
| 6,781,452 B2 | 8/2004 | Cioffi et al. | |
| 7,091,777 B2 | 8/2006 | Lynch | |
| 8,144,440 B2 | 3/2012 | Aoki | |
| 10,993,293 B2 | 4/2021 | Mattfolk et al. | |
| 2014/0125293 A1 * | 5/2014 | Kainuma | H02M 7/217 |
| | | | 320/166 |
| 2016/0095171 A1 | 3/2016 | Chaimov et al. | |
| 2016/0219654 A1 | 7/2016 | Cho | |

FOREIGN PATENT DOCUMENTS

| | | |
|---|---|---|
| RU | 2122338 | 11/1998 |
| WO | 9202111 | 2/1992 |
| WO | 2007080859 | 7/2007 |
| WO | 2015099649 | 7/2015 |
| WO | 2015099650 | 7/2015 |
| WO | 2015099651 | 7/2015 |
| WO | 2016144872 | 9/2016 |

* cited by examiner

MICROWAVE OVEN HAVING GENERATOR POWER SUPPLY

CROSS-REFERENCE TO RELATED APPLICATIONS

This application is a divisional application of U.S. patent application Ser. No. 16/307,232 filed Dec. 5, 2018, entitled "MICROWAVE OVEN HAVING GENERATOR POWER SUPPLY," by Alessandro Gigante et al., which a national stage application of Application No. PCT/US2016/048040 filed on Aug. 22, 2016, entitled "MICROWAVE OVEN HAVING GENERATOR POWER SUPPLY," by Alessandro Gigante et al., the entire disclosures of which are incorporated herein by reference.

BACKGROUND

The present disclosure generally relates to a cooking apparatus, and more particularly, to a microwave oven having a generator power supply unit with a discharge function.

A conventional microwave oven cooks food by a process of dielectric heating in which a high-frequency alternating electromagnetic field is distributed throughout an enclosed cavity. A sub-band of the radio frequency spectrum, microwave frequencies at or around 2.45 GHz cause dielectric heating primarily by absorption of energy in water.

To generate microwave frequency radiation in a conventional microwave, a voltage applied to a high-voltage transformer results in a high-voltage power that is applied to a magnetron that generates microwave frequency radiation. The microwaves are then transmitted to an enclosed cavity containing the food through a waveguide. Cooking food in an enclosed cavity with a single, non-coherent source like a magnetron can result in non-uniform heating of the food. To more evenly heat food, microwave ovens include, among other things, mechanical solutions such as a microwave stirrer and a turntable for rotating the food. A common magnetron-based microwave source is not narrowband and not tunable (i.e., emits microwaves at a frequency that is changing over time and not selectable). As an alternative to such a common magnetron-based microwave source, solid-state sources can be included in microwave ovens which are tunable and coherent.

SUMMARY

According to one aspect of the present disclosure, a microwave oven is provided having a door movable between an open state and a closed state and a microwave generator for generating microwaves. A generator power supply unit is provided having the following components ordered from upstream to downstream: a first converter for converting a power input to a power output; a first energy reserve electrically coupled to the first converter for receiving the power output; a second converter electrically coupled to the first energy reserve for converting the power output to a low voltage power output; and a second energy reserve electrically coupled to the second converter for receiving the low voltage power output and supplying the low voltage power output to the microwave generator. A detection circuit is configured to detect an input voltage and disable the second converter based on the door being in the open state, wherein disabling the second converter triggers the second energy reserve to discharge, and wherein the time necessary to discharge the second energy reserve is free of influence from the first energy reserve.

According to another aspect of the present disclosure, a microwave oven is provided and includes a door movable between an open state and a closed state and a microwave generator for generating microwaves. A generator power supply unit is provided having the following components ordered from upstream to downstream: a first converter for converting a power input to a power output; a first energy reserve electrically coupled to the first converter for receiving the power output; a second converter electrically coupled to the first energy reserve for converting the power output to a low voltage power output; and a second energy reserve located downstream from the first energy reserve and electrically coupled to the second converter for receiving the low voltage power output and supplying the low voltage power output to the microwave generator. A detection circuit is configured to detect an input voltage and disable the second converter based on the door being in the open state, wherein disabling the second converter triggers the second energy reserve to discharge, and wherein the time necessary to discharge the second energy reserve is independent of the detected input voltage.

According to yet another aspect of the present disclosure, a method of operating a microwave oven to reduce microwave leakage is provided. The method includes the steps of: sensing that a door of the microwave is in an open state; interrupting a power input to a generator power supply unit comprising a first converter, a first energy reserve, a second energy reserve located downstream from the first energy reserve, and a second converter located between the first and second energy reserves; detecting an input voltage; and disabling the second converter if the detected input voltage is less than a threshold voltage that is proportional to the detected input voltage, wherein disabling the second converter triggers the second energy reserve to discharge, and wherein the time necessary to discharge the second energy reserve is free of influence from the first energy reserve and is independent of the detected input voltage.

These and other aspects, objects, and features of the present disclosure will be understood and appreciated by those skilled in the art upon studying the following specification, claims, and appended drawings.

DETAILED DESCRIPTION

It is to be understood that the specific devices and processes illustrated in the attached drawings, and described in the following specification are simply exemplary embodiments of the inventive concepts defined in the appended claims. Hence, other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The present disclosure may be implemented in any environment using a radio frequency (RF) generator or amplifier capable of generating a field of electromagnetic radiation (e-field) in the radio frequency spectrum regardless of the application of the e-field and regardless of the frequency or frequency range of the e-field. For purposes of this description, any e-field generating device, for example, a microwave generator or infrared signal generator, will be generally referred to as an RF generator, or similar language, and any e-field applying device, such as a waveguide, an antenna, or anode/cathode coupling or pair, will be generally referred to as an RF applicator. These descriptions are meant to make clear that one or more frequencies or frequency ranges of e-field may be included in the embodiments described herein. While this description is primarily directed toward a microwave oven providing an e-field capable of heating and or cooking food (collectively, "cooking"), it is also applicable to alternative uses of e-field generation such as drying fabrics, for example.

Figure 1:
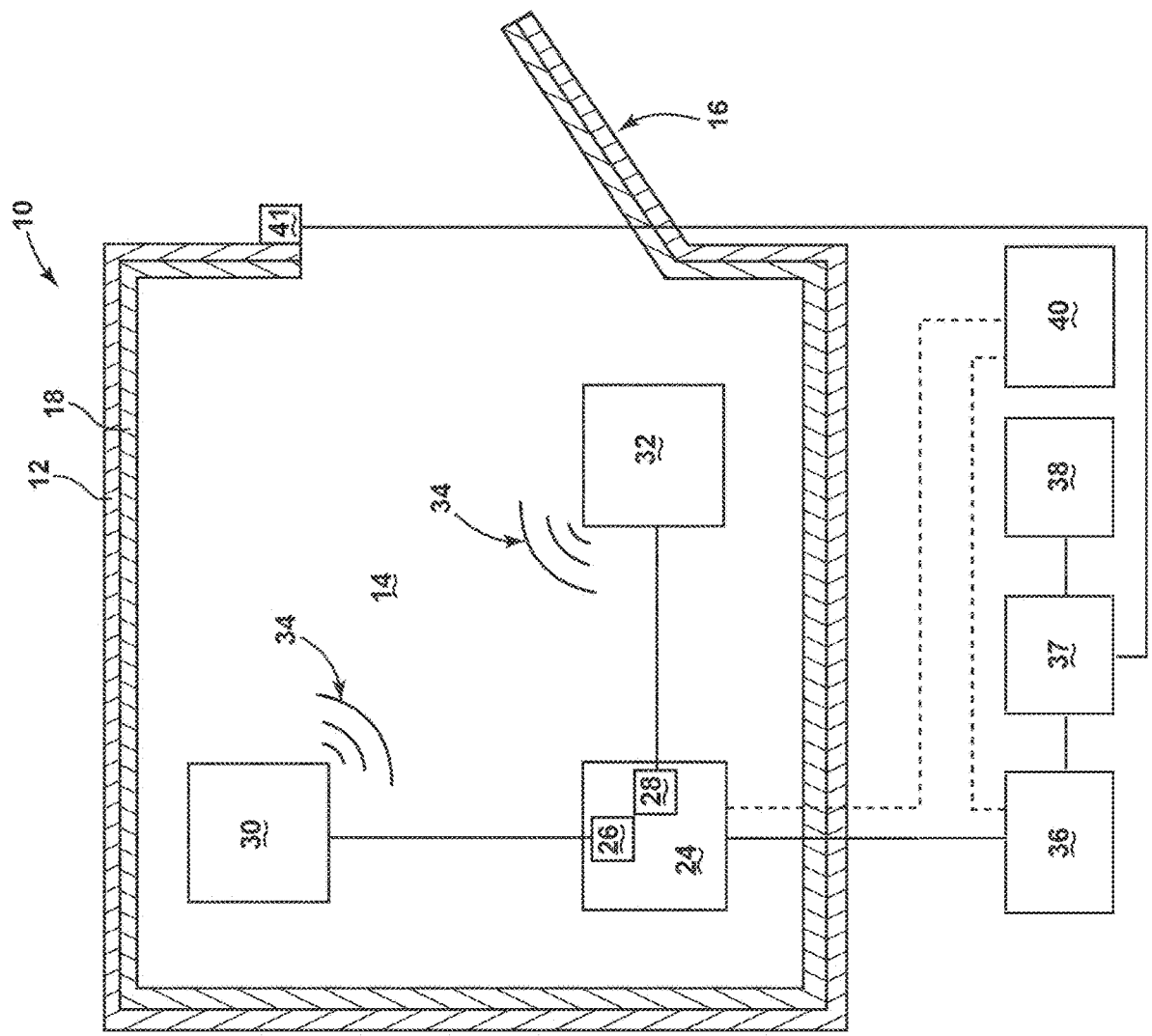
FIG. 1 is a schematic view of a microwave oven according to one embodiment.

FIG. 1 schematically illustrates an RF device in the form of a microwave oven 10 including a cabinet 12 defining a cavity 14 for electromagnetically heating and/or cooking food, or foodstuff, in the cavity 14. The microwave oven 10 also includes a door 16 movably mounted to the cabinet 12, an RF shielding layer, for example, wire mesh 18, removably or fixedly attached to the cabinet 12 and the door 16. The door 16 is movable between an opened state and a closed state to selectively provide access to the cavity 14, for instance, to allow for inserting food items to be cooked or for removing food items previously cooked. When closed, the door 16 and corresponding segment of the wire mesh 18 are configured to align with the cabinet 12 to effectively prevent access to, and/or effectively seal, the cavity 14. The cavity 14 is further sealed due to the configuration of the wire mesh 18, which operates to prevent e-field leakage into, or out of, the cabinet 12 and cavity 14.

The microwave oven 10 further includes a microwave generator shown as an RF generator 24 having at least one RF amplifier, shown as a first solid state RF amplifier 26 and a second solid state RF amplifier 28. The microwave oven 10 further includes at least one RF applicator, shown as a first RF applicator 30 and a second RF applicator 32, each of which is configured to apply an e-field 34 to the cavity 14. The microwave oven 10 also includes a generator power supply unit 36, an interruption circuit 37, a power source 38 (e.g., mains power), and a controller 40. While the cavity 14 is shown to include the RF generator 24 and the first and second RF applicators 30, 32 located in opposing corners of the cavity 14, other embodiments contemplate alternative placements of the RF generator 24 and the first and second RF applicators 30, 32, including a configuration where the RF generator 24 and the first and second RF applicators 30, 32 are located outside of the cavity 14. In one specific embodiment, the first and second RF applicators 30, 32 are waveguides that feed an e-field into the cavity 14. Furthermore, while the generator power supply unit 36, interruption circuit 37, power source 38, and controller 40 are generally shown outside of the cabinet 12, they are collectively contemplated to be included as components of the oven 10, and various placements of the aforementioned components are contemplated, which may include placement within the cavity 14, cabinet 12, and/or wire mesh 18.

As shown, the first solid state RF amplifier 26 may be electrically coupled with the first RF applicator 30 and the second solid state RF amplifier 28 may be electrically coupled with the second RF applicator 32. The RF generator 24 may also be electrically coupled with the generator power supply unit 36, which may further be electrically coupled to the power source 38 via the interruption circuit 37. The interruption circuit 37 is configured to electrically couple the power source 38 to the generator power supply unit 36 when the door 16 is in a closed state and electrically decouple the power source 38 to the generator power supply unit 36 when the door 16 is in an open state. Accordingly, the interruption circuit 37 may be electrically coupled to a door switch, shown as door switch 41, which is configured to provide a signal indicative of a state of the door 16 to the interruption circuit 37. The controller 40 is shown communicatively coupled (illustrated as dotted lines) to the RF generator 24 and the generator power supply unit 36. In operation, the controller 40 may provide communication signals to one or more of the foregoing components for controlling the operation thereof.

The RF generator 24 is configured to receive a power input from the generator power supply unit 36 and may generate one, two, three, four, or any number of RF signals, as needed by the particular oven application. The RF generator 24 is further configured to deliver each respective signal to a corresponding RF amplifier 26, 28. In the depicted embodiment, the RF generator 24 is capable of generating two RF signals, each of which is delivered to the corresponding first and second solid state RF amplifiers 26, 28 such that each of the first and second solid state RF amplifiers 26, 28 amplifies an independent RF signal. Thus, it is contemplated that each RF signal may correspond to at least one of the first and second RF amplifiers 26, 28. As a non-limiting example, it is contemplated that one RF signal may correspond to one RF amplifier, two RF signals may correspond to two respective RF amplifiers, three RF signals may correspond to three respective RF amplifiers, four RF signals may correspond to four respective RF amplifiers, and so on and so forth. In contrast, it is also contemplated that one RF signal may correspond to, for example, two, three, or four RF amplifiers, such that each RF amplifier amplifies the same RF signal. Accordingly, it should be appreciated that any number of combinations and/or permutations of any number of RF signals and/or RF amplifiers as described are contemplated.

Each of the first and second RF amplifiers 26, 28 may be correspondingly configured to deliver the amplified signal to the one or more RF applicators 30, 32, which are configured to direct the amplified RF signal, shown as an e-field 34, into the cavity 14. The generator power supply unit 36 may be additionally configured to operatively convert power received from the power source 38 to an alternative power output. For example, the generator power supply unit 36 may be configured to convert an alternating current (AC) power input to a high current, low voltage direct current (DC) power output. However, it should be appreciated that alternative power conversions are contemplated, and the example provided is merely one non-limiting example of a power conversion. Additionally, the controller 40 may be any appropriate device that is capable of receiving input signals, generating, processing, and/or determining commands, and providing the commands and/or command signals based on said commands, as one or more outputs. For example, the controller 40 may include one or more programmable logic devices, application specific integrated circuits, digital signal processors, and/or microcontrollers.

During operation of the microwave oven 10, food items to be cooked are placed into the cavity 14 via the open door 16, and then the door 16 is closed. The controller 40 operates to control the microwave oven 10 such that the power source 38 provides a power input to the generator power supply unit 36, which is controlled to convert the power input from the power source 38 to a sufficient power output delivered to the RF generator 24. One example of the generator power supply unit 36 may include, for instance, converting an AC power input to a low voltage (DC) output. In response, the RF generator 24 may generate a radio frequency electromagnetic radiation (e-field) signal, which may be significantly or trivially amplified by each respective first and second RF amplifier 26, 28, and delivered from each first and second RF amplifier 26, 28 to the respective first and second RF applicators 30, 32 for application of the electromagnetic radiation to the cavity 14.

Figure 2:
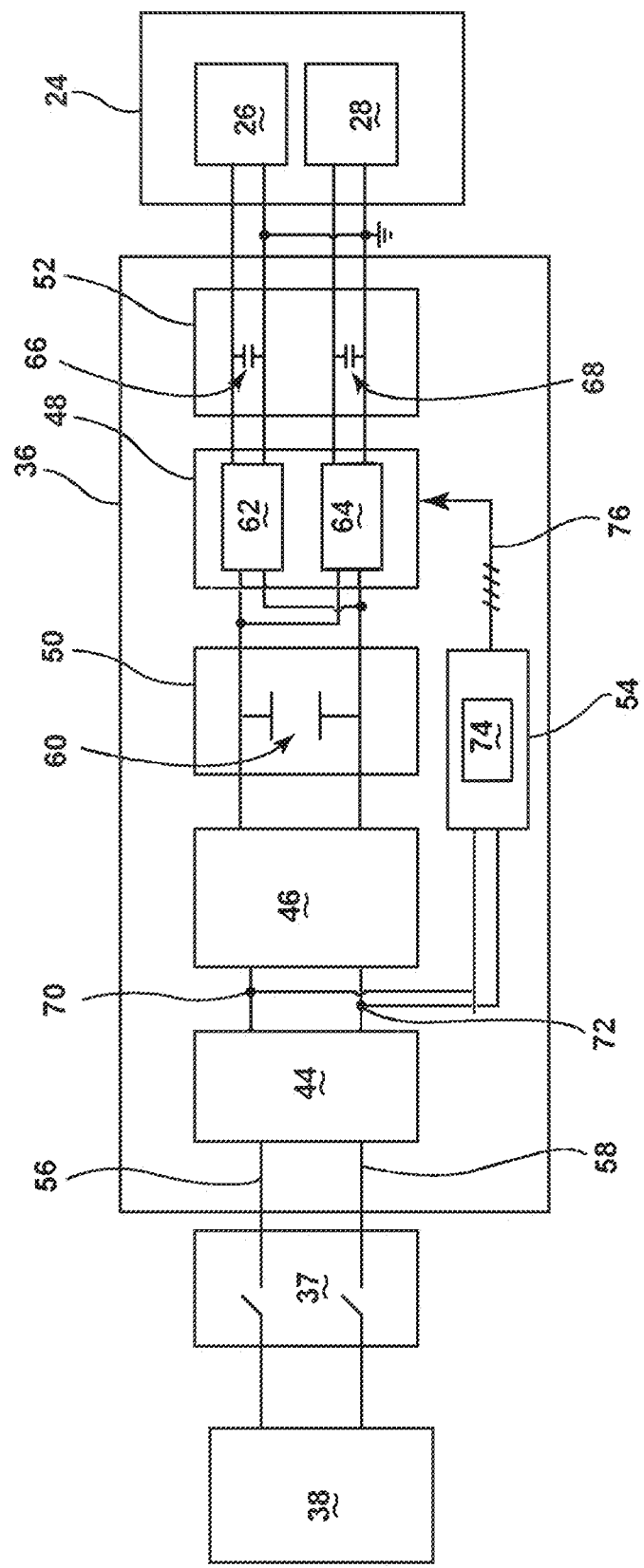
FIG. 2 is a schematic view of an electrical connection between a power source, a generator power supply unit, and an RF generator of the microwave oven.

FIG. 2 schematically illustrates the power source 38, the interruption circuit 37, the generator power supply unit 36, and the RF generator 24 in further detail. In the depicted embodiment, the generator power supply unit 36 includes, as components, a bridge rectifier 44, at least one converter shown as a first converter 46 and a second converter 48, and at least one energy reserve shown as a first energy reserve 50 and a second energy reserve 52. For purposes of understanding, the aforementioned components are shown ordered in a linear arrangement to more clearly illustrate the direction of power transfer, beginning at the power source 38, then moving across the components from an upstream to downstream direction (i.e., from left to right in FIG. 2), and ultimately ending at the RF generator 24. As shown, the components of the generator power supply unit 36 are positioned on a voltage line 56 and a ground line 58, both of which also serving to electrically connect the power source 38, the generator power supply unit 36, and the RF generator 24. While a detection circuit 54 is illustrated as being a component of the generator power supply unit 36, it should be appreciated that the detection circuit 54 may be separately provided in other embodiments. With respect to any of the embodiments described herein, operation of the detection circuit 54 may be based on a state of the door 16.

In the depicted embodiment, the interruption circuit 37 electrically couples the power source 38 to the generator power supply unit 36 while in a closed state, and electrically decouples the power source 38 to the generator supply 36 while in an open state. The power input provided by the power source 38 to the generator power supply unit 36 may correspond to an AC power input. As shown, the interruption circuit 37 is electrically connected to the bridge rectifier 44, which rectifies the power input. In the depicted embodiment, the bridge rectifier achieves full-wave rectification of the AC power input. The bridge rectifier 44 is also electrically coupled to the first converter 46 for converting the power input to a power output. In the depicted embodiment, the first converter 46 is configured as an AC to DC converter so as to convert the AC power input to a DC power output. The first converter 46 is electrically coupled to the first energy reserve 50, which receives the power output, i.e., the DC power output, and may include a bulk capacitor 60 that becomes energized from the DC power output supplied thereto from the first converter 46. The second converter 48 is electrically coupled to the first energy reserve 50 for converting the DC power output to a low voltage DC power output. The second energy reserve 52 is located downstream from the first energy reserve 50 and is electrically coupled to the second converter 48 for receiving the low voltage DC power output and supplying the low voltage DC power output to the RF generator 24.

In the depicted embodiment, the second converter 48 includes a first DC to DC converter 62 and a second DC converter 64, each configured to convert the DC power output to the low voltage DC power output and individually supply the low voltage DC power output to a corresponding one of a first output capacitor 66 and a second output capacitor 68 of the second energy reserve 52. In turn, the first and second output capacitors 66, 68 individually supply the low voltage DC power output to a corresponding one of the first solid state RF amplifier 26 and the second solid state RF amplifier 28. In embodiments having additional RF amplifiers, a corresponding number of DC to DC converters and output capacitors may be similarly configured for individual power delivery.

With continued reference to FIG. 2, the detection circuit 54 is configured to detect an input voltage and disable the second converter 48 based on the door 16 being in the open state. In the depicted embodiment, detection circuit 54 detects the input voltage upstream from the first converter 46. For example, the input voltage may correspond to a rectified peak AC input voltage detected between the output of the bridge rectifier 44 and the input of the first converter 46 at a first point 70 on voltage line 56 and a second point 72 on ground line 58. For purposes of disclosure, the voltage line 56 and the ground line 58 will be collectively referred to herein as "the main line". As shown, the detection circuit 54 includes a comparator 74 for comparing the detected rectified peak AC input voltage to a threshold voltage that is proportional to the detected rectified peak AC input voltage. If the detected rectified peak AC input voltage is greater than the threshold voltage, the detection circuit 54 functions on standby, or in other words, does not disable the second converter 48. Such a scenario may occur, for example, when the door 16 is in a closed state and the microwave oven 10 is executing a cooking operation. In such an instance, the power source 38 is electrically coupled to the generator power supply unit 36 via the interruption circuit 37. As a result, the detected rectified peak AC input voltage is generally greater than the threshold voltage.

In contrast, if the detected rectified peak AC input voltage is less than the threshold voltage, the detection circuit 54 bypasses the bridge rectifier 44, the first converter 46, and the first energy reserve 50 and disables the second converter 48 (e.g., each of the first and second DC to DC converters 62, 64) by transmitting a switch-off signal 76 thereto. In one implementation, the foregoing threshold condition is satisfied shortly after the door 16 is opened while a cooking application is underway. More specifically, when the door 16 is opened, the interruption circuit 37 electrically decouples the power source 38 from the generator power supply unit 36, thereby ceasing the supply of power input to the generator power supply unit 36 from the power source 38. As a result, the detected rectified peak AC input voltage will satisfy the threshold condition after a period of time, typically no more than 10 milliseconds. In operation, disabling the second converter 48 triggers the second energy reserve 52 (e.g., each of the first and second output capacitors 66, 68) to quickly discharge in an effort to minimize the amount of microwave leakage due to the door 16 being opened while a cooking process is underway. Advantageously, since the detection circuit 54 bypasses components located downstream of the second converter 48, the time necessary to discharge the second energy reserve 52 is free of influence from said components, namely the first energy reserve 50 (e.g., bulk capacitor 60). In other words, in embodiments where the detection circuit 54 is not included, the time necessary to discharge the second energy reserve 52 would be dependent on the time necessary to discharge the first energy reserve 50, thereby increasing the amount of microwave leakage while the door 16 is opened. As an added advantage, the inclusion of the detection circuit 54 enables the first energy reserve 50 to remain charged while the discharging of the second energy reserve 52 is underway. With respect to the depicted embodiment, the threshold voltage may be maintained at a predetermined value greater than zero so as to avoid a deactivation of the switch-off signal 76.

Figure 3:
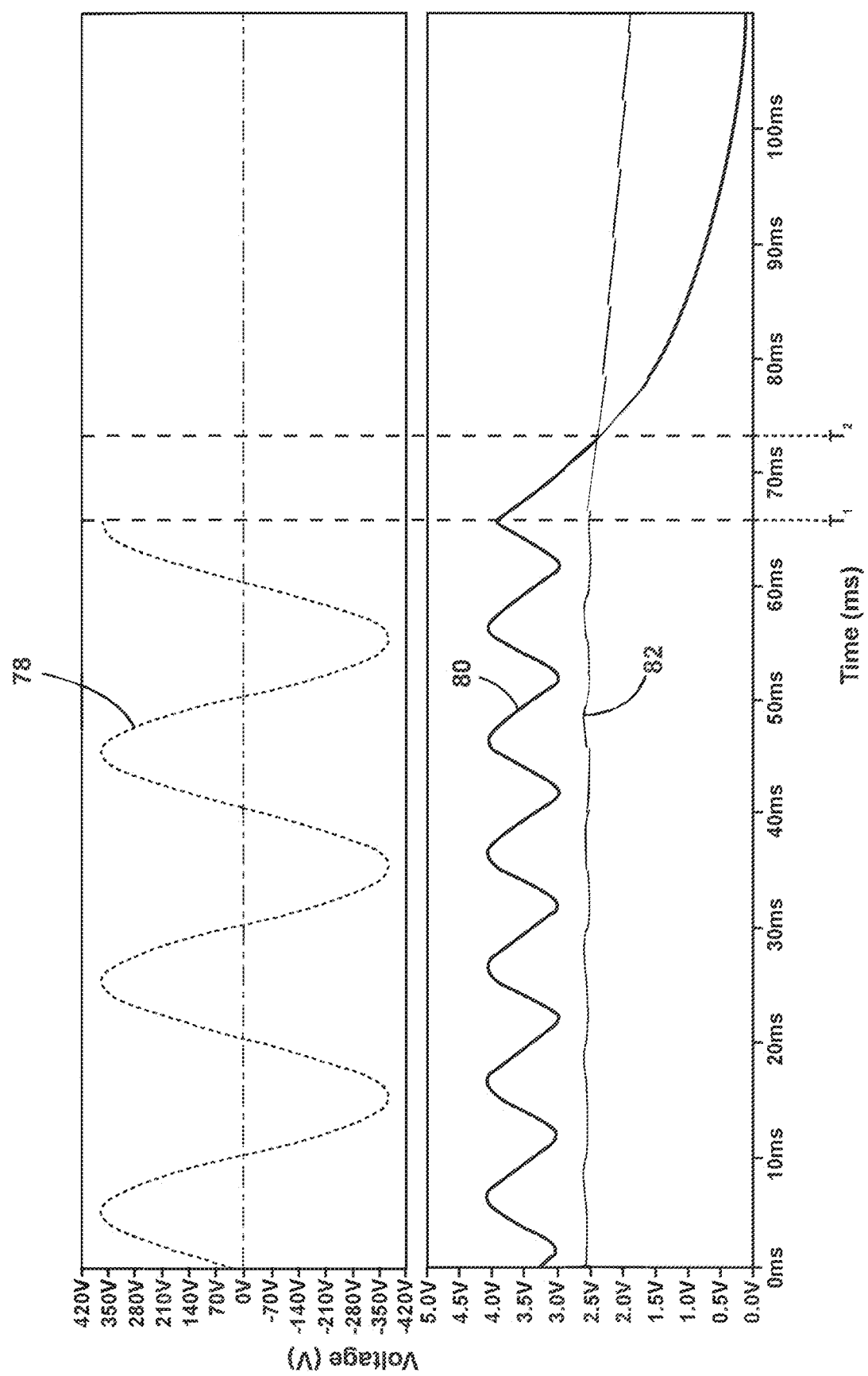
FIG. 3 is a graphical representation of a detection time for a maximum input voltage provided to the generator power supply unit.
Figure 4:
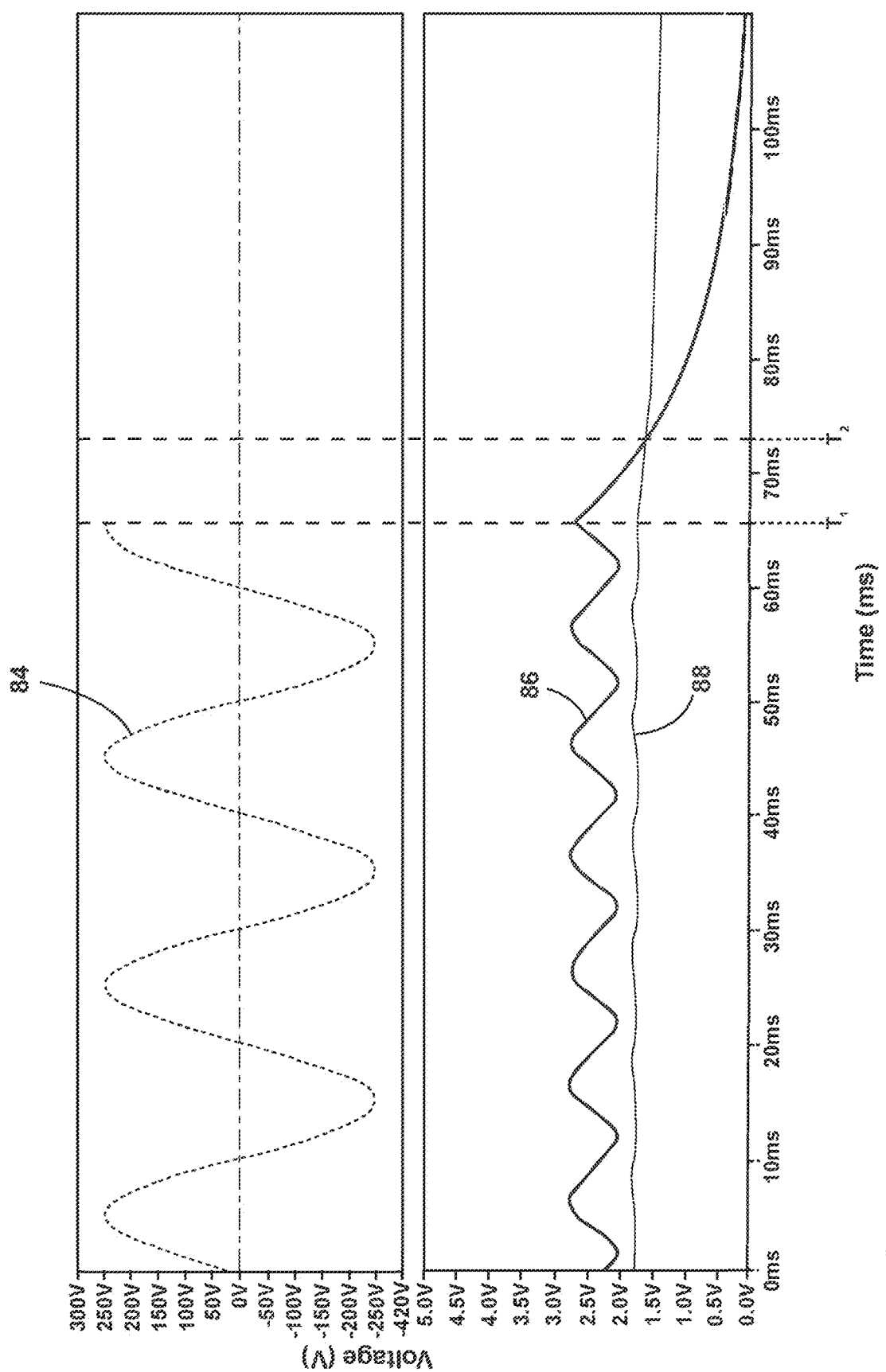
FIG. 4 is a graphical representation of a detection time for a minimum input voltage provided to the generator power supply unit.

Referring to FIGS. 3 and 4, graphs are shown illustrating a detection time at which the threshold condition (i.e., the detected rectified peak AC input voltage is less than the threshold voltage) is satisfied following an electrical decoupling of the power source 38 and the generator power supply unit 36. In FIG. 3, the top graph illustrates a maximum peak AC input voltage 78 of approximately 264 $V_{rms}$ and the bottom graph illustrates a corresponding detected rectified peak AC input voltage 80 and voltage threshold 82. In FIG. 4, the top graph illustrates a minimum peak AC input voltage 84 of approximately 177 $V_{rms}$ and the bottom graph illustrates a corresponding detected rectified peak AC input voltage 86 and voltage threshold 88. It should be appreciated that the maximum and minimum peak AC input voltages are provided as non-limiting examples and may correspond to other values, if desired. With reference to both FIGS. 3 and 4, the power source 38 is decoupled from the generator power supply unit 36 at time $T_1$, thereby ceasing the supply of the maximum and minimum peak AC input voltages 78, 84, respectively. At time $T_2$, the threshold condition is satisfied, thereby prompting the detection circuit 54 to transmit the switch-off signal 76 to the second converter 48 in order to trigger the discharge of the second energy reserve 52. As can be seen in FIGS. 3 and 4, the detection time, i.e., the time between $T_1$ and $T_2$, at which the threshold condition is satisfied is the same regardless of the input voltage supplied by the power source 38. Accordingly, by extension, the time necessary to discharge the second energy reserve 52 is independent of the input voltage (i.e., the voltage associated with the input power supplied by the power source 38) and the detected input voltage (i.e., the voltage detected on the main line).

Figure 5:
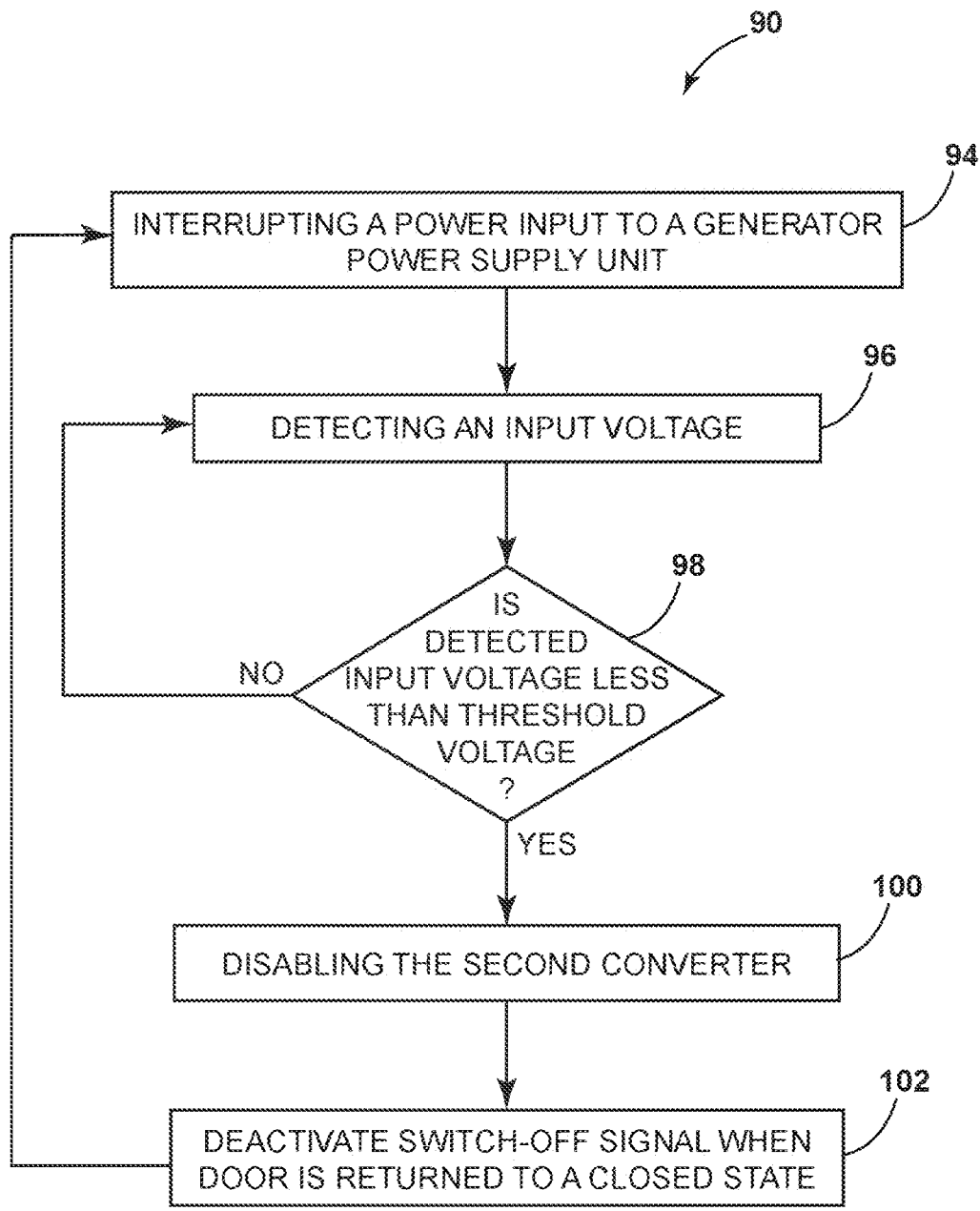
FIG. 5 is a flow diagram of a method of operating the microwave oven to reduce microwave leakage.

Referring to FIG. 5, a flow diagram is shown illustrating a method 90 of operating a microwave oven during a door opening event. The method 90 may be implemented using the microwave oven 10 and associated components described previously with reference to FIGS. 1-4. In describing the method 90, it is assumed that a cooking process is underway and the door 16 of the microwave oven 10 is initially in the closed state. Additionally, it is assumed a user later opens the door 16 prior to the completion of the cooking process. With these assumptions in mind, the method includes, at step 94, interrupting a power input to the generator power supply unit 36, as set forth at step 94. As described herein, this may be achieved by electrically decoupling the power source 38 from the generator power supply unit 36 via the interruption circuit 37 when the door 16 is moved to an open state. In turn, the detection circuit 54 is operated to detect an input voltage at step 96. As described herein, the detected voltage may correspond to a detected rectified peak AC input voltage. If the detected input voltage satisfies a threshold condition (decision block 98), the detection circuit 54 disables the second converter 48 at step 100 via the switch-off signal 76. Otherwise, the detection circuit 54 continues to detect the input voltage until the threshold condition is satisfied. As described herein, disabling the second converter 48 triggers the second energy reserve 52 to discharge. By virtue of the detection circuit 54 bypassing the first energy reserve 50, the time necessary to discharge the second energy reserve 52 is free of influence from the first energy reserve 50 and is independent of the detected input voltage, thus minimizing the exposure to microwave leakage. The second converter 48 may remain disabled until the door 16 is returned to a closed state, at which point the switch-off signal is deactivated, as set forth at step 102.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned microwave oven 10 without departing from the concepts provided herein, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A microwave oven comprising:
    a door movable between an open state and a closed state;
    a microwave generator for generating microwaves, the microwave generator including at least one solid state amplifier; and
    a generator power supply unit comprising the following components ordered from upstream to downstream:
        a first converter for converting a power input to a power output;
        a first energy reserve electrically coupled to the first converter for receiving the power output;
        a second converter electrically coupled to the first energy reserve for converting the power output to a low voltage power output; and
        a second energy reserve located downstream from the first energy reserve and electrically coupled to the second converter for receiving the low voltage power output and supplying the low voltage power output to the at least one solid state amplifier of the microwave generator; and
    a detection circuit configured to detect an input voltage and disable the second converter when the input voltage is less than a threshold voltage as a result of the door being in the open state, wherein disabling the second converter triggers the second energy reserve to discharge, and wherein the time necessary to discharge the second energy reserve is independent of the detected input voltage.

2. The microwave oven as claimed in claim 1, further comprising an interruption circuit for electrically decoupling the generator power supply unit from a power source configured to supply the power input, and wherein the interruption circuit electrically decouples the generator power supply unit from the power source if the door is in the open state.

3. The microwave oven as claimed in claim 1, wherein the detection circuit comprises a comparator for comparing the detected input voltage to a threshold voltage that is proportional to the detected input voltage.

4. The microwave oven as claimed in claim 3, wherein the detection circuit transmits a switch-off signal for disabling the second converter if the detected input voltage is less than the threshold voltage.

5. The microwave oven as claimed in claim 4, wherein the threshold voltage is maintained at a value greater than zero.

6. The microwave oven as claimed in claim 1, wherein the power input comprises an AC power input, the power output comprises a DC power output, the low voltage power output comprises a low voltage DC power output, and the input voltage comprises a rectified peak AC input voltage.

7. The microwave oven as claimed in claim 1, wherein the input voltage is detected upstream of the first converter.

8. The microwave oven as claimed in claim 1, wherein the detection circuit bypasses components of the generator power supply unit located upstream from the second converter such that the first energy reserve remains charged while the discharging of the second energy reserve is underway.

9. The microwave oven as claimed in claim 1, wherein the microwave generator includes at least one solid state amplifier, and the second energy reserve supplies the low voltage power output to the at least one solid state amplifier of the microwave generator.

10. A method of operating a microwave oven during a door opening event, where the microwave oven includes a microwave generator including at least one solid state amplifier that receives power from a generator power supply unit, the method comprising the steps of:
    interrupting a power input to the generator power supply unit when the door is in an open state, the generator power supply unit comprising a first converter, a first energy reserve, a second energy reserve located downstream from the first energy reserve, and a second converter located between the first and second energy reserves;
    detecting an input voltage; and
    disabling the second converter if the detected input voltage is less than a threshold voltage that is proportional to the detected input voltage, wherein disabling the second converter triggers the second energy reserve to discharge, and wherein the time necessary to discharge the second energy reserve is free of influence from the first energy reserve and is independent of the detected input voltage.

11. The method as claimed in claim 10, wherein the power input is interrupted using an interruption circuit for electrically decoupling the generator power supply unit from a power source configured to supply the power input, and wherein the interruption circuit electrically decouples the generator power supply unit from the power source if the door is in the open state.

12. The method as claimed in claim 10, wherein the first energy reserve remains charged while the discharging of the second energy reserve is underway.

13. The method as claimed in claim 10, wherein the threshold voltage is maintained at a value greater than zero.

14. The method as claimed in claim 10, wherein the input voltage changes as a result of the door being in the open state.

15. The method as claimed in claim 14, wherein the microwave oven includes a microwave generator including at least one solid state amplifier that receives power from a generator power supply unit.

16. The method as claimed in claim 10, wherein the microwave oven includes a microwave generator including at least one solid state amplifier that receives power from a generator power supply unit.

* * * * *